May 12, 1964 D. G. CLEMONS 3,133,271

MAGNETIC MEMORY CIRCUITS

Filed Sept. 11, 1961

INVENTOR
D. G. CLEMONS
BY William H. Kamstra
ATTORNEY

United States Patent Office 3,133,271

Patented May 12, 1964

3,133,271
MAGNETIC MEMORY CIRCUITS

Donald G. Clemons, Newark, N.J., assignor to Bell Telephone Laboratories, Incorporated, New York, N.Y., a corporation of New York Filed Sept. 11, 1961, Ser. No. 137,281
7 Claims. (Cl. 340—174)

Figure 1:
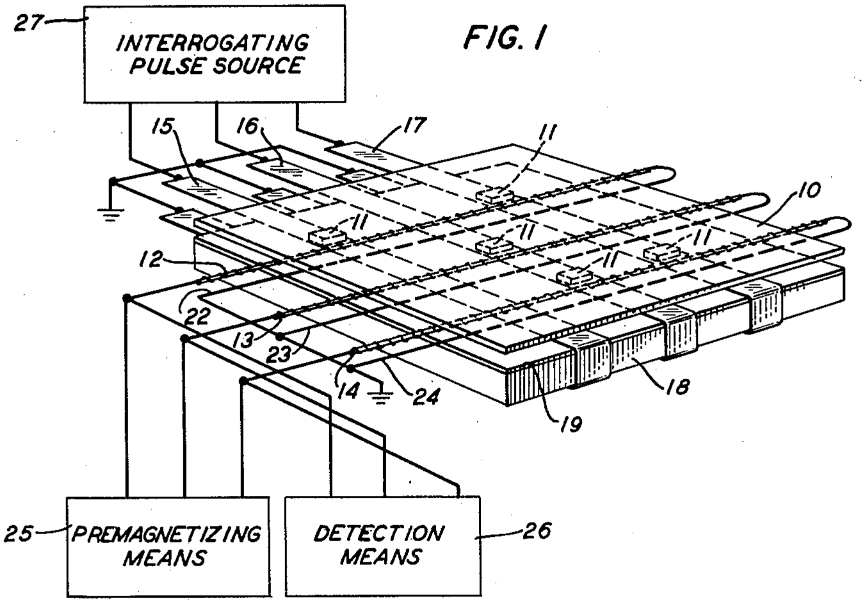

This invention relates to information handling systems and more particularly to systems in which information is stored in conjunction with magnetic wire memory elements.

Magnetic memory circuits, in which specific information bits are stored in a coordinate array of magnetic elements such as toroidal magnetic cores, multi-apertured magnetic elements, and the like, are well known in the information handling art. Another magnetic element which has proved highly advantageous for the multiple storage of information bits is the magnetic wire memory element having a helical flux component associated therewith. The flux component may be formed, for example, by helically winding a magnetic tape around a conductor. Such a memory element and an illustrative memory array comprised thereof is described, for example, in the copending application of A. H. Bobeck, Serial No. 675,522, filed August 1, 1957, now Patent No. 3,083,353 issued March 26, 1963. In magnetic memory arrangements generally an information bit is stored in an information address in the form of a representative condition of remanent magnetization of the storage element assigned as the address. The substantially rectangular hysteresis properties of the magnetic materials employed in the fabrication of the memory elements makes such remanent magnetization possible as is also well known. In a magnetic wire memory element of the character referred to hereinbefore, discrete information addresses are measured off at segments of the length by energizing solenoids inductively coupled thereto at predetermined intervals. An information bit is then stored in an address by a particular representative remanent magnetization in the helical magnetic components within the wire segment.

In each of the foregoing arrangements, the information bits are contemplated as being stored in the information addresses as representative remanent magnetizations. In another information storage arrangement magnetic memory elements in a coordinate array also play an advantageous role, but in this case rather as a means for interrogating information stored in a particular pattern of individual magnet means. In one such illustration memory array, a particular pattern of permanent magnets is arranged closely adjacent a corresponding coordinate array of magnetic memory elements. The field of each of the permanent magnets is sufficient to magnetically saturate the adjacent corresponding magnetic element. When an interrogation drive magnetomotive force is now applied to the memory elements having permanent magnets adjacent thereto, the latter memory elements as a result will be unable to respond by flux switching. This result may be detected in the conventional manner by the absence of readout signals on sensing conductors coupled to the memory elements. This absence is conventionally held indicative of stored binary "0's" in the pattern of permanent magnets. Where no permanent magnets appear adpacent the magnetic memory elements, the interrogating drive will be effective to cause a flux switching in the adjacent memory elements. As a result, and also in the conventional manner, output signals will be induced in coupled sensing conductors, which signals will be indicative of stored binary "1's".

The pattern of permanent magnets may be advantageously affixed to a nonmagnetic card or plate. The points on the card corresponding to the crosspoints of the associated coordinate array of magnetic elements at which no permanent magnets are affixed are thus representative of binary "1's." An advantageous information storage arrangement is thus achieved in which information, although permanently storable, is readily changed by simply removing the permanent magnet card containing one grouping of information and substituting for it a second card containing another information grouping. Such an information storage arrangement in which toroidal magnetic core elements are employed is described in the copending application of the administratrix of the estate of S. M. Shackell, deceased, Serial No. 708,127, filed January 10, 1958.

Although in the illustrative permanent magnet storage arrangement referred to in the immediately foregoing, toroidal cores are advantageously employed as interrogating elements, magnetic wire memory elements may be employed for this purpose with equal facility. By replacing a coordinate of toroidal core elements with a single wire element, particular address segments of the wire element may be disabled from flux switching during interrogation by adjacently disposed permanent magnets. Information may conveniently be stored in such an arrangement on a word-organized basis. In such an arrangement word rows may be defined on a planar array of parallel magnetic wire elements by interrogating windings in the form of flat strip word solenoids, inductively coupled to the elements and arranged substantially transversely to the wire elements, which enclose the wire elements. The information bearing magnetic cards are positioned outside of the interrogating solenoids. An interrogating signal applied to one of the word solenoids then causes flux reversals to occur in only those bit addresses inductively coupled by the solenoid which do not have magnets positioned adjacent them. Voltages induced by these flux reversals are detected and an entire binary word may thus be read out of the storage array by the application of an interrogating signal to a single one of the interrogation solenoids.

It has been found, however, that the output from a particular bit address of the storage array described above may be affected by fields from neighboring magnets. Thus, the outputs from addresses storing binary "1's" may vary considerably since these fields affect the flux reversals within these addresses during interrogation. This effect of neighboring magnets on a particular bit address will be designated the interaction effect. The interaction effect can be reduced by weakening the individual magnets, however a magnet must be sufficiently strong to inhibit switching in its adjacent bit address. Thus, there is a limit to the number of magnets which can be carried by a card, to the proximity of magnet cards associated with adjacent planes of a multiplane storage array, to the magnitude of the applied interrogation signal and, consequently, to the speed of the interrogation phase of operation.

Accordingly, it is an object of this invention to reduce the interaction effects on particular bit addresses of a storage arrangement utilizing magnetic wire elements, which effects are caused by the proximity of permanent magnets to the bit addresses.

It is another object of this invention to provide a memory array utilizing magnetic wire elements and permanent magnet storage means in which a greater storage density may be obtained than has heretofore been realized in such arrays.

It is a further object of this invention to increase substantially the effective switching field applied to bit addresses of magnetic wire elements by signals of a given magnitude applied to interrogation solenoids inductively coupled to the addresses.

A further object of this invention is the realization of a new and improved memory matrix.

Another object of this invention is the realization of a memory array the outputs of which exhibit an improved one-to-zero ratio.

It is a further object of this invention to provide a memory array utilizing magnetic wire elements and permanent magnet storage means in which a substantial increase in the speed of the interrogation phase of operation is obtained.

It is still another object of this invention to provide a memory array utilizing magnetic wire elements which achieves economies of fabrication and operation not heretofore obtained.

The above and other objects of this invention are realized in one specific illustrative embodiment thereof which comprises an array of magnetic wire elements utilized to interrogate information stored in a pattern of permanent magnets. Flat strip word solenoids inductively coupled to the wire elements and defining bit addresses thereon do not, in this embodiment, physically enclose the wire elements. Rather, the magnetic wire elements are sandwiched between the solenoids and a removable magnet card, that is, a card made of an electrically conducting nonmagnetic material having permanent magnets affixed thereto. This arrangement permits the permanent magnets, which inhibit flux switching in particular bit addresses of the elements, to be located closer to the elements than in arrangements in which the elements are enclosed by the solenoid. Weaker magnets may therefore be utilized and a reduction in interaction effects is achieved. This arrangement also simplifies fabrication of the array. A sheet of low magnetic reluctance material sandwiched between the strip solenoids and a mounting board supporting the solenoids achieves a further substantial reduction in the interaction effect of the magnets, substantially increases the magnetic switching field at a particular bit address produced by a current of a given magnitude in the strip solenoid, and permits the solenoid mounting board to be made of an electrically conducting material.

As the magnetic field caused by an interrogation signal applied to one of the solenoids is being established, eddy currents are generated in the conducting magnet card, which currents create a magnetic field which opposes the field being established by the solenoid current. However, since the magnetic wire element associated with the above solenoid is positioned between the solenoid and the conducting card, the switching fields applied to bit addresses of this element result from the additive effects of the fields produced by the solenoid current and the eddy currents.

The interaction effects caused by the fields of the permanent magnets affecting the switching of bit addresses other than their associated addresses are considerably reduced by the addition of the low reluctance sheet. The sheet serves to constrain the fields of the magnets thereby reducing their effect on neighboring addresses while having only negligible effects on their adjacent addresses. Thus, the strength of the magnets utilized can be increased thereby permitting the utilization of larger switching fields and, consequently, the achievement of a faster interrogating operation. Additionally, the reduction in the interaction effect permits a greater density of bits along each wire memory element to be achieved. A further increase in the bit density of a multiplane array can also be achieved by positioning the memory elements of each plane closer to one another. A still further increase can be achieved by utilizing much thinner solenoid mounting boards thereby positioning the planes much closer together because of the reduction in interaction effects between magnets of one plane of the array and memory elements of other planes.

The switching fields applied to particular bit addresses of the array by an interrogation signal of a given magnitude are also substantially increased by the sheet of low reluctance material sandwiched between the solenoid and its mounting board. The sheet provides a low reluctance return path for the magnetic field produced by the solenoid current therefore enabling a current of given magnitude to establish a substantially greater field than it would in the absence of the low reluctance sheet.

Without the low reluctance sheet between the solenoid and the mounting board, the board must be of a nonconducting material since otherwise eddy currents induced in the board by the establishment of the solenoid field would be in a direction to severely reduce the switching fields applied to the bit addresses. The presence of the sheet, however, serves to constrain the solenoid field substantially within the sheet rather than through the board therefore enabling the board to be made of aluminum, or any other conducting material, thereby in turn permitting further economies to be achieved in the fabrication of the array.

In another embodiment of this invention, an additional sheet of low reluctance material is affixed to the conducting magnet card on the side opposite from the permanent magnets. This sheet acts to further constrain the fields of the magnets thereby achieving an additional reduction in the interaction effect. A further increase in the bit density of a multiplane array according to this invention is achieved by a low reluctance sheet affixed to the magnet card since such an arrangement permits magnet cards which are adjacent one another in the array to be positioned much closer to one another without the fields produced by the magnets of one card interfering with those of the other card. The positioning of these cards closer together thus allows the planes of the array to be more closely packed thereby further increasing the bit density of the array.

Thus, according to one feature of this invention, information is read out of a pattern of permanent magnets by the switching of particular bit addresses on an array of magnetic wire elements in which the wire elements are sandwiched between strip solenoids inductively coupled thereto and an electrically conducting nonmagnetic card on which the magnets are positioned.

According to another feature of this invention, a magnetic wire memory array is provided in which a sheet of low magnetic reluctance material is positioned in proximity to a pattern of information storing permanent magnets.

In accordance with another feature of this invention information stored in a pattern of permanent magnets is interrogated by an array of magnetic wire memory elements in which strip solenoids inductively coupled to the magnetic wire memory elements are sandwiched between the wire elements and a sheet of low magnetic reluctance material.

According to still another feature of this invention a magnetic memory array in which information is stored in a pattern of permanent magnets is provided with a sheet of low magnetic reluctance material affixed to a card which also supports the pattern of magnets.

Figure 2A:
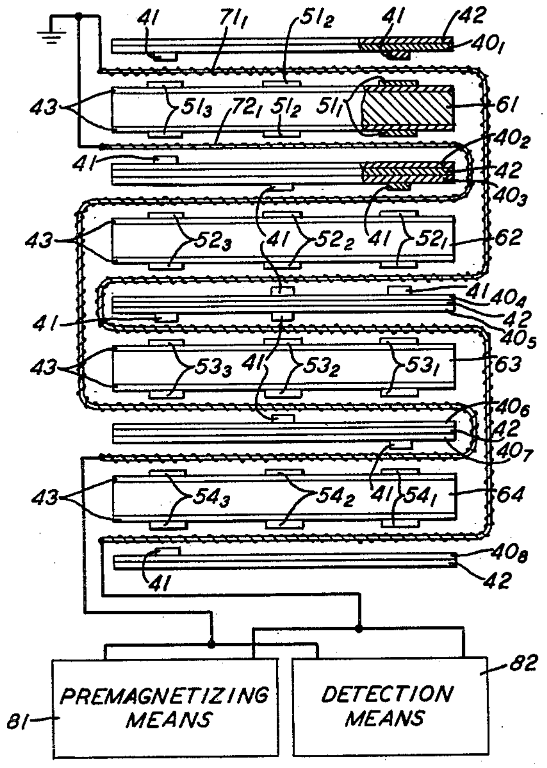
Figure 2B:
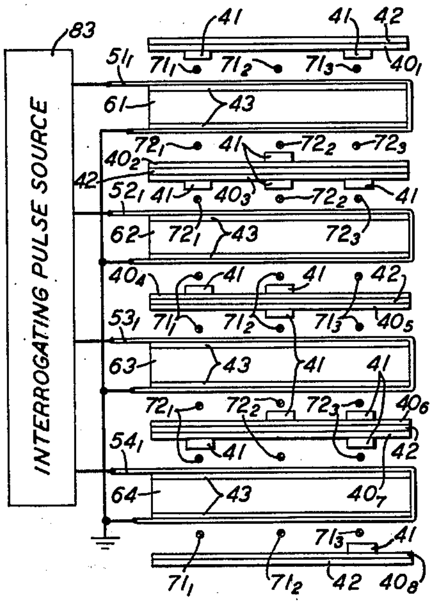

The foregoing and other objects and features of this invention will be more clearly understood by a consideration of the following detailed description thereof when taken in conjunction with the accompanying drawing in which:

FIG. 1 depicts a single plane of a simplified magnetic wire element memory matrix according to the principles of this invention;

FIG. 2*a* depicts a side view of a multiplane magnetic wire element memory matrix according to the principles of this invention showing an interfolded arrangement of the wire elements; and FIG. 2*b* depicts another side view of the memory matrix of FIG. 2*a* showing the wire elements in cross section.

A specific embodiment of a memory matrix according to this invention is shown in FIG. 1. A magnet card 10 is shown having a particular arrangement of permanent magnets 11 thereon. The card is made of nonmagnetic electrically conducting material such as, for example, aluminum, and is removably positioned in proximity to magnetic wire memory elements 12, 13, and 14. Flat strip word solenoids 15, 16, and 17, wrapped around, but electrically insulated from, solenoid supporting board 18, are inductively coupled to the wire memory elements 12, 13, and 14. The word solenoids are arranged substantially transversely to the memory elements and define information bit addresses on the elements at their crosspoints. The magnets 11 are positioned on the card 10 such that each magnet is in proximity to a particular one of the bit addresses on the wire memory elements. A sheet 19 of low reluctance nonconductive magnetic material such as, for example, annealed permalloy, is sandwiched between the board 18 on the address side thereof and the solenoids 15, 16, and 17. Electrically conducting return wires 22, 23, and 24 are arranged substantially parallel with, and are connected at one end to, the memory elements 12, 13, and 14, respectively, and are connected at their other end to a source of ground potential. The wire memory elements 12, 13, and 14 are connected at their other end to both a premagnetizing means 25 and a detection means 26. The premagnetizing means 25 is shown in block diagram form and may comprise any well known circuit capable of providing pulses of the character and at the times described hereinafter. The detection means 26 is also shown in block diagram form and may comprise any well known circuit capable of detecting voltage signals appearing across the memory elements and their associated return conductors. Each of the word solenoids 15, 16 and 17 is connected between a source of ground potential and a source of interrogating pulses 27. The source 27 is also shown in block diagram form and may comprise any well known circuit, such as a biased core switch, capable of selectively applying bipolar signals of the character and at the times described hereinafter to the solenoids 15, 16 and 17. Bearing in mind the foregoing organization, a description of the operation of this circuit will now be set forth.

An initial current pulse from premagnetizing means 25, applied after positioning the card 10 in the matrix of FIG. 1, drives the entire length of each of the wire memory elements 12, 13 and 14 to one condition of remanent magnetization. The buffer regions between bit addresses on the memory wires are thereby driven to uniform conditions of remanent magnetization and adverse effects caused by some of these regions being in a partially switched condition during the operation of the array are minimized. Such adverse effects on the bit addresses caused by flux excursions in the buffer regions are discussed in the copending application of J. L. Rogers, Serial No. 39,403 filed June 28, 1960, now Patent No. 3,011,158, issued November 28, 1961.

Information is stored in the array by the particular arrangement of magnets 11 on the card 10. An information word is stored in the pattern of magnets 11 associated with those bit addresses defined on the memory elements 12, 13 and 14 by a single one of the solenoids 15, 16 and 17. Thus, if the presence of a magnet is considered representative of the storage of a binary "0" and its absence, of a binary "1," then the words associated with the solenoids 15, 16 and 17 are respectively "011," "100," and "010." Alternatively, information storage may be accomplished by an arrangement of magnets associated with each of the bit addresses but with particular ones of the magnets being in a demagnetized condition.

Information is read out of the array by selectively applying interrogating current signals from the source 27 to solenoids 15, 16 and 17 of a polarity to drive the bit addresses to the opposite condition of remanent magnetization from that to which they were driven by the previous premagnetizing signal. Those bit addresses not having a magnet 11 adjacent thereto consequently switch to the opposite remanent condition thereby inducing signals in their associated memory elements which are detected by detection means 26. Following the interrogation phase of operation, opposite polarity reset signals applied from source 27 reset those bit addresses which were switched by the interrogating pulses.

If the information word stored in that part of the card 10 associated with solenoid 15 is to be interrogated, for example, a pulse is applied from source 27 which pulse switches those bit addresses on memory elements 13 and 14 associated with solenoid 15. The bit address on memory element 12 associated with solenoid 15 is prevented from switching by the holding field of the permanent magnet 11 adjacent this address. Signals induced in memory elements 13 and 14 by switching of addresses on these wires are detected by means 26 as well as the absence of any appreciable signal induced in memory element 12. Such a combination of output signals is indicative of the binary word "011" and the detection of these signals indicates that the word "011" is stored in the pattern of magnets 11 associated with the bit addresses defined on memory elements 12, 13 and 14 by solenoid 15. In a similar manner, the words "100" and "010" stored in the magnet patterns associated with the bit addresses defined on solenoids 16 and 17, respectively, may be detected. The return wires 22, 23 and 24 are associated with the memory elements 12, 13 and 14, respectively, to permit detection of signals induced in the memory elements without necessitating an external return path. Thus, a signal induced in one of the memory elements is detected across one end of the memory element and one end of its associated return wire, the two ends being physically close to one another. If the return conductors were not present, signals induced in a memory element would be detected across the ends of the memory element and an external means for connecting these ends to a detection device would then be necessary. Such external return paths are especially disadvantageous in multiplane arrays where the greater length of the paths enables spurious or erroneous signals to interfere with the operation of the array.

The magnet card 10 is made of an electrically conducting material to enable eddy currents to be set up therein by the interrogation signals applied to the solenoids 15, 16 and 17 from the source 27. As magnetic fields are being set up by the interrogation current signals applied to the solenoids, these fields induce eddy currents in the card 10. These eddy currents are of a polarity such that their magnetic field opposes the magnetic field of the interrogation signals except in the space between the card 10 and the solenoids 15, 16 and 17 in which space the two fields reinforce each other. Since the memory elements 12, 13 and 14 are in this space, the effective switching field applied to the memory elements during the interrogating phase of operation is a combination of these two fields. The presence of the conducting card 10 thus serves to increase substantially the switching field applied to the memory elements. It further enables the card 10 and magnets 11 to be positioned much closer to the memory elements 12, 13 and 14 than is possible in arrangements wherein the solenoids enclosed the wire memory elements. Since the field applied to a particular bit address by its adjacent magnet increases as the magnet is positioned closer to the address, this arrangement permits the use of weaker magnets than is otherwise possible thereby reducing the interaction effect. Conversely, a stronger field may be applied to a particular address without increasing the strength of the magnets used, thereby permitting the use of interrogation signals of larger magnitude and the consequent achievement of faster switching without at the same time increasing the interaction effect.

The low magnetic reluctance sheet 19 positioned between the solenoids 15, 16 and 17 and board 18 serves both to increase substantially the switching field caused by the interrogation signals applied to the solenoids and to decrease greatly the interaction effect. The low reluctance material constrains the fields of the magnets 11 thereby reducing substantially their effect on neighboring bit addresses while having only negligible effects on the field of a magnet at its adjacent address. The magnets may therefore be stronger, thus permitting interrogation signals of a larger magnitude to be applied to the solenoids and thereby achieving faster interrogation, because of the presence of the sheet 19. The reduction in the interaction effects also permits the bit density of an array to be increased by permitting a greater density of bits along each wire memory element 12, 13 and 14 than was heretofore possible, and also by permitting the elements 12, 13 and 14 to be positioned closer to one another than was previously possible. Furthermore, by permitting the use of stronger magnets, tolerances in the selection of magnets are relaxed with consequent achievement of economies in the construction of an array.

The sheet 19 further substantially increases the switching field produced by the interrogation signals applied to the solenoids 15, 16 and 17 by providing a low reluctance return path for this field. Thus, an interrogation signal of a given magnitude produces a much greater switching field when the sheet 19 is positioned close to the solenoids 15, 16 and 17 than it does in the absence of such a low reluctance sheet. The sheet 19 also serves to shield the solenoid board 18 from the field produced by the interrogation signals thereby permitting the board 18 to be constructed of an electrically conducting material such as, for example, aluminum, with attendant economies over previously required nonconducting materials. A conducting material could not be used for the board 18 in the absence of the sheet 19 since the magnetic field of the interrogation signals would then produce eddy currents in the board 18, the magnetic fields of which would diminish the switching fields applied to the bit addresses.

Turning now to FIGS. 2*a* and 2*b* there are depicted two different side views of a multiplane memory matrix according to the principles of this invention. The same elements in these two views will be designated by the same reference characters and both views may be considered simultaneously in connection with the following discussion of this embodiment.

Electrically conducting nonmagnetic removable cards $40_1$ through $40_8$ having particular arrangements of permanent magnets 41 thereon are shown. Sheets of low magnetic reluctance nonconductive material 42 are positioned adjacent cards $40_1$ and $40_8$ on the sides opposite the magnets 41 carried by these cards and are also sandwiched between cards $40_2$ and $40_3$, between cards $40_4$ and $40_5$ and between cards $40_6$ and $40_7$, contacting these cards on the sides opposite from the magnets 41 located thereon. Flat strip word solenoids $51_1$, $51_2$, and $51_3$ are wrapped around a solenoid supporting board 61 and are inductively coupled to magnetic wire memory elements $71_1$, $71_2$, and $71_3$ just above board 61 as shown in FIG. 2*b* and to magnetic wire memory elements $72_1$ $72_2$, and $72_3$ just below board 61. In a similar manner word solenoids $52_1$, $52_2$, and $52_3$ are wrapped around board 62, solenoids $53_1$, $53_2$, and $53_3$ are wrapped around board 63, and solenoids $54_1$, $54_2$, and $54_3$ are wrapped around board 64, with all of these word solenoids being also inductively coupled to the memory elements $71_1$, $71_2$, $71_3$, $72_1$, $72_2$, and $72_3$. The elements 71 and 72 are passed back and forth through the planes of the matrix as shown in FIG. 2*a*. The word solenoids are arranged substantially transverse to the wire memory elements and define information bit addresses on the elements at their crosspoints. The magnets 41 are arranged on the cards $40_1$ through $40_8$ such that they are positioned closely to particular ones of the bit addresses on the wire memory elements. Sheets of low magnetic reluctance material 43 are positioned adjacent to each side of each of the boards 61 through 64. The memory elements $71_1$, $71_2$, $71_3$, $72_1$, $72_2$, and $72_3$ are connected at one end to a source of ground potential and at their other end to both a premagnetizing means 81 and a detection means 82. The premagnetizing means 81 is shown in block diagram form and may comprise any well known circuit capable of providing pulses of the character at the times described hereinafter. The detection means 82 is also shown in block diagram form and may comprise any well known circuit capable of detecting voltage signals induced in the wire memory elements. Each of the word solenoids 51 through 54 is connected between a source of ground potential and an interrogating pulse source 83. The source 83 is also shown in block diagram form and may comprise any well known circuit capable of selectively applying signals of the character to be described hereinafter to the solenoids 51 through 54. Bearing in mind the foregoing organization, a description of the operation of this circuit, which is very similar to the operation of the circuit of FIG. 1, previously described, will now be set forth.

An initial current pulse from premagnetizing means 81, applied after positioning the cards 40 in the matrix of FIGS. 2*a* and 2*b*, drives the entire length of each of the memory elements 71 and 72 to one condition of remanent magnetization thereby minimizing the adverse effects caused by partial switching of the buffer regions previously discussed.

Information is stored in the array by the particular arrangement of magnets 41 on the cards 40. An information word is stored in the pattern of magnets associated with those bit addresses defined on the memory wires 71 and 72 by a single one of the solenoids 51 through 54. Thus, if the presence of a magnet at a bit address is considered representative of the storage of a binary "0" and its absence, of a binary "1," then the words associated with the solenoids $51_1$ through $54_1$ are, respectively, reading from left to right for each portion of a solenoid, "010101," "000001," "101100" and "010110," as shown in FIG. 2*b*.

If the information word stored in those parts of the cards $40_1$ and $40_2$ associated with solenoid $51_1$ is to be interrogated, for example, a pulse is applied from source 83 to solenoid $51_1$ of a polarity to switch those addresses associated with solenoid $51_1$ in which binary "1's" are stored. Voltage signals are thereby induced in the memory wires of these bit addresses. Specifically, voltage signals are thus induced in memory elements $71_2$, $72_1$ and $72_3$ and their detection by means 82 is indicative that the binary word "010101" is stored in the pattern of magnets associated with the bit addresses defined on the elements 71 and 72 by solenoid $51_1$. The magnets 41 adjacent the bit addresses defined on the elements $71_1$, $71_3$ and $72_2$ by solenoid $51_1$ prevent signals from being induced in these memory elements. Following interrogation an opposite polarity reset signal applied to solenoid $51_1$ from source 83 resets those bit addresses which were switched by the interrogating pulses. The words stored in the bit addresses associated with solenoids $52_1$, $53_1$, and $54_1$ are similarly read out by applying interrogating signals from source 83 to these windings and detecting the signals induced in the memory wires 71 and 72.

The sheets of low magnetic reluctance material 43 adjacent to each side of the boards 61 through 64 serve, in a manner similar to the sheet 19 as described in connection with the discussion of the embodiment shown in FIG. 1 greatly to decrease the interaction effect, to increase substantially the switching field caused by the interrogating signals applied from the source 83 to solenoids $51_1$ through $54_1$ and to permit the boards 61 through 64 to be made of more economical electrically conducting materials. Thus, the density of bit addresses along each wire may be increased, the wires of each plane may be positioned closer to one another, the planes of the array may be positioned closer together, faster switching during the interrogation phase of operation may be achieved since stronger magnets and increased switching fields may be utilized, and other economies in fabrication and operation may be realized.

Eddy currents induced in the conducting magnet cards $40_1$ through $40_8$ also produce fields, in a manner similar to those discussed in connection with the conducting card 10 of FIG. 1, which aid the switching fields applied to the bit addresses during the interrogation phase of operation.

The low reluctance sheets 42 positioned adjacent the cards $40_1$ and $40_8$ and between each consecutive pair of the cards $40_2$ through $40_7$ serve further to decrease the interaction effect by further constraining the fields of the magnets 41 located on the cards $40_1$ through $40_8$ adjacent each of the sheets 42. The sheets 42 also permit a further increase in the bit density of the array by permitting those of the cards $40_1$ through $40_8$ located between two adjacent ones of the boards 61 through 64 to be positioned much closer together without the magnets affixed to one card interfering with the magnets of the other card. Thus, the cards $40_4$ and $40_5$, for example, positioned between boards 62 and 63, are separated only by the sheet of low reluctance material 42. The sheet 42, however, by providing a low reluctance path for the magnetic fields produced by the magnets 41 affixed to these cards, permits such positioning of the cards $40_4$ and $40_5$ without interference arising between their respective patterns of magnets 41. Magnet cards having sheets of low reluctance material adjacent thereto may also be advantageously used to reduce interaction effects in magnetic memory arrays in which flat strip solenoids physically enclose the wire memory elements and are thus positioned between the memory elements and the information bearing magnet cards.

Separate low reluctance sheets may advantageously be utilized with each of the cards $40_2$ through $40_7$ in another embodiment of this invention similar to that shown in FIGS. 2*a* and 2*b* in which spring means, not shown, are positioned between the low reluctance sheets adjacent each of the pairs of magnet cards $40_2$, $40_3$; $40_4$, $40_5$; and $40_6$, $40_7$. The spring means advantageously serve to provide a uniform pressure between the magnet cards and their adjacent wire memory elements and also aid in the insertion and removal of pairs of magnet cards when it is necessary to change the information stored in the array by the substitution of a new pair of magnet cards.

For illustrative purposes, return conductors, such as the conductors 22, 23 and 24 described in connection with the discussion of the embodiment of FIG. 1, are not shown in FIGS. 2*a* and 2*b*. However, such conductors may also be advantageously used in the embodiment shown in FIGS. 2*a* and 2*b* in which case the detection means 32 detects voltages induced across the memory wires 71 and 72 and their associated return conductors.

What have been described are considered to be only illustrative embodiments according to the principles of the present invention and it is to be understood that numerous other arrangements may be devised by one skilled in the art without departing from the spirit and scope thereof.

What is claimed is:

1. A magnetic memory construction comprising a plurality of permanent magnets arranged at particular crosspoints of XY coordinates in a pattern representative of stored information, means for interrogating said information comprising a plurality of conducting wires each having a preferred helical flux path axially coincident therewith, said helical flux path having substantially rectangular hysteresis characteristics, said conducting wires being arranged along said X coordinates in the fields of said permanent magnets, a plurality of interrogating solenoids arranged along said Y coordinates in inductive coupling with said plurality of conducting wires, means for selectively applying current pulses to said plurality of interrogating solenoids to generate switching fields at each of said crosspoints, and means for controlling said switching fields comprising a nonmagnetic electrically conducting first sheet having said permanent magnets affixed thereto and a low magnetic reluctance nonconducting second sheet arranged in inductive coupling with said solenoids, said solenoids being positioned between said first and said second sheets; and means for detecting voltage changes in said plurality of conducting wires.

2. A magnetic memory matrix for storing information in the form of a pattern of permanent magnets comprising means for reading out said information including a plurality of conducting wires each having a preferred helical flux path axially coincident therewith, said helical flux paths having substantially rectangular hysteresis characteristics, a plurality of interrogating solenoids inductively coupled to said conducting wires and defining a plurality of address segments thereon, means for selectively applying concentrated switching fields to said address segments including means for selectively applying current pulses to said plurality of interrogating solenoids, an electrically conducting nonmagnetic card positioned near said plurality of conducting wires, said permanent magnets being affixed to one side of said card such that their fields saturate particular ones of said address segments, said plurality of conducting wires being positioned between said plurality of interrogating solenoids and said card, a low magnetic reluctance sheet inductively coupled to said permanent magnets for constraining the fields of said magnets, and means for detecting voltage changes across said plurality of conducting wires.

3. A magnetic memory matrix according to claim 2 in which said plurality of interrogating solenoids is positioned between said low reluctance sheet and said plurality of conducting wires.

4. A magnetic memory matrix according to claim 2 in which said low reluctance sheet is affixed to the other side of said electrically conducting card.

5. In a multiplane magnetic memory matrix for storing information in the form of a pattern of permanent magnets, a first and a second plurality of conducting wire, each having a preferred helical flux path axially coincident therewith, said helical flux paths having substantially rectangular hysteresis characteristics, a plurality of interrogating solenoids wrapped about a support means, the portions of said solenoids on one side of said support means being inductively coupled to said first plurality of conducting wires and defining first information addresses thereon, the portions of said solenoids on the other side of said support means being inductively coupled to said second plurality of conducting wires and defining second information addresses thereon, means for selectively applying current pulses to said plurality of interrogating solenoids, a first and a second electrically conducting nonmagnetic sheet positioned near said first and second pluralities of conducting wires, respectively, said permanent magnets being affixed to said sheets such that their fields saturate particular ones of said first and second information addresses, a first and a second low magnetic reluctance sheet inductively coupled to said first and second information addresses respectively said first and second low magnetic reluctance sheets being positioned between said support means and said portions of said solenoids on one side of said support means and between said support means and said portions of said solenoids on the other side of said support means, respectively, and means for detecting voltage changes across said first and second pluralities of conducting wires.

6. In a multiplane magnetic memory matrix for storing information in the form of a pattern of permanent magnets, a first and a second electrically conducting nonmagnetic sheet, a single low magnetic reluctance sheet juxtaposed between said first and second conducting sheets, a plurality of conducting wires, each having a preferred helical flux path axially coincident therewith, said helical flux paths having substantially rectangular hysteresis characteristics, said plurality of conducting wires positioned in propinquity to said first and second sheets and curved about said first and second sheets such that a first portion of said conducting wires is associated with said first sheet and a second portion of said conducting wires is associated with said second sheet, a first plurality of interrogating solenoids inductively coupled to said first portion of said conducting wires defining a first plurality of information addresses thereon, a second plurality of interrogating solenoids inductively coupled to said second portion of said conducting wires defining a second plurality of information addresses thereon, said single low magnetic reluctance sheet being inductively coupled to said first and second plurality of information addresses, said permanent magnets being affixed to said first and second conducting sheets such that their fields saturate particular ones of said first and second pluralities of information addresses, means for selectively applying current pulses to said first and second pluralities of interrogating solenoids, and means for detecting voltage changes across said plurality of conducting wires.

7. A magnetic memory matrix for storing information in the form of a pattern of permanent magnets comprising means for reading out said information including a plurality of conducting wires each having a preferred helical flux path axially coincident therewith, said helical flux paths having substantially rectangular hysteresis characteristics, a plurality of interrogating solenoids inductively coupled to said conducting wires and defining a plurality of address segments thereon, means for selectively applying concentrated switching fields to said address segments including means for selectively applying current pulses to said plurality of interrogating solenoids, a nonmagnetic card positioned near said plurality of conducting wires, said permanent magnets being affixed to one side of said card such that their fields saturate particular ones of said address segments, a low magnetic reluctance sheet inductively coupled to said plurality of information segments, and means for detecting voltage changes across said plurality of conducting wires.

References Cited in the file of this patent

UNITED STATES PATENTS 3,060,411 Smith ---------------- Oct. 23, 1962